(12) United States Patent
Kayyidavazhiyil et al.

(10) Patent No.: US 9,805,182 B1
(45) Date of Patent: Oct. 31, 2017

(54) AUTHENTICATION USING A CLIENT DEVICE AND A MOBILE DEVICE

(71) Applicant: EMC Corporation, Hopkinton, MA (US)

(72) Inventors: Abhilash Kayyidavazhiyil, Karnataka (IN); Sourabh Jain, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 14/497,811

(22) Filed: Sep. 26, 2014

(51) Int. Cl.
*H04L 29/06* (2006.01)
*G06F 21/35* (2013.01)

(52) U.S. Cl.
CPC .................................. *G06F 21/35* (2013.01)

(58) Field of Classification Search
CPC ....................................................... G06F 21/35
See application file for complete search history.

(56) References Cited

U.S. PATENT DOCUMENTS

| | | | |
|---|---|---|---|
| 7,750,793 B2 | 7/2010 | Juels | |
| 7,911,346 B1 | 3/2011 | Claudatos et al. | |
| 7,920,050 B2 | 4/2011 | Juels et al. | |
| 8,190,906 B1 | 5/2012 | Elbeery et al. | |
| 8,378,786 B2 | 2/2013 | Bailey et al. | |
| 8,618,913 B1 | 12/2013 | Bailey et al. | |
| 8,847,761 B1 | 9/2014 | Claudatos et al. | |
| 2012/0240204 A1* | 9/2012 | Bhatnagar | G06F 21/35 726/5 |
| 2013/0111208 A1* | 5/2013 | Sabin | G06F 21/35 713/171 |
| 2014/0040628 A1* | 2/2014 | Fort | G06F 21/34 713/182 |
| 2014/0230039 A1* | 8/2014 | Prakash | G06F 21/35 726/9 |
| 2016/0112437 A1* | 4/2016 | Churyumov | G06F 21/43 726/7 |

OTHER PUBLICATIONS

Dodson, Ben, et al., "Secure, Consumer-Friendly Web Authentication and Payments with a Phone", 1-21.*

* cited by examiner

*Primary Examiner* — Carl Colin
*Assistant Examiner* — Ghodrat Jamshidi
(74) *Attorney, Agent, or Firm* — BainwoodHuang (57) ABSTRACT

A technique authenticates a user to server equipment. The technique involves reading, by a mobile device, a visual pattern from a client device, the mobile device and the client device being separate and distinct and in possession of the user. The technique further involves includes generating, by the mobile device, a token message based on the visual pattern. The technique further involves providing, by the mobile device, the token message to the server equipment to authenticate the user to the server equipment.

16 Claims, 5 Drawing Sheets

200

Read a visual pattern (e.g., a bar code image) from an electronic display of a client device using a mobile device (e.g., using a camera of a smartphone, tablet, etc.), the mobile device being separate and distinct from the client device and in possession of a user, the client device having received the visual image from server equipment in response to an access request which provides a user identifier uniquely identifying the user
— 202

▼

Generate a token message based on the visual pattern (e.g., extract the user identifier and an authentication session identifier from the visual pattern, generate a OTP, and embed the OTP and identifiers in the token message and optionally include mobile device artifacts)
— 204

▼

Provide the token message to the server equipment to authenticate the user to the server equipment and, if authentication is successful, access a protected resource, the token message being conveyed via a separate communications channel to the communications channel used to deliver the visual image from the server equipment to the client device
— 206

AUTHENTICATION USING A CLIENT DEVICE AND A MOBILE DEVICE

BACKGROUND

A server may control access to a protected resource. In order for a computer user to access the protected resource using a computer, the computer user may be required to enter a username and a one-time use passcode (OTP) which changes over time (e.g., periodically, after each use, etc.) into the computer which conveys the username and the OTP to the server to authenticate the computer user (e.g., in a web-based exchange). To obtain the OTP, the computer user may be required to manually read and type in the OTP from a display of an authentication token in the computer user's possession (e.g., a hardware token, a soft token installed on the computer user's smartphone, etc.).

When the server receives the username and the OTP from the computer user, the server either grants or denies access to the protected resource. In particular, if the OTP provided by the computer user matches an OTP which is expected for the computer user, authentication is considered successful and the server permits the computer user to access the protected resource. However, if the OTP provided by the computer user does not match the expected OTP (e.g., the OTP provided by the computer user is incorrect or stale), authentication is considered unsuccessful and the server denies access to the protected resource.

SUMMARY

Unfortunately, there are deficiencies to the above-described conventional authentication approach in which a computer user uses a computer to send a username and OTP to a server in order to access a protected resource. For example, in the above-described conventional authentication approach, the computer user must manually enter the username and the OTP into the computer. Not only is this manual activity burdensome on the computer user and prone to error (e.g., false negatives if the computer user misreads or mistypes the OTP), the length of the OTP is typically limited to just a few characters to avoid being a nuisance to the computer user thus limiting security. Additionally, since the computer user must be able to type the OTP into the computer, the OTP is limited to characters which can be effectively displayed, read, and typed (e.g., numbers and letters) thus lowering OTP entropy. Furthermore, (i) the device and channel which are used to access the protected resource and (ii) the device and channel which are used to provide the authentication credentials are the same, thus providing common security weak points.

In contrast to the above-described conventional authentication approach in which a computer user uses a computer to send a username and OTP to a server in order to access a protected resource, improved techniques are directed to authentication using both a client device and a mobile device. In particular, a user first directs the client device to initiate an authentication session with a server. Upon receipt of a response from the server, the client device displays a visual pattern (e.g., a bar code image provided by the server). The mobile device electronically reads this visual pattern, generates a token message based on the visual pattern, and provides the token message to the server to authenticate the user. Such techniques do not require a computer user to manually read or type in OTPs. Rather, the mobile device is capable of electronically embedding a OTP in the token message, and then sending the token message to the server based on the visual pattern. Accordingly, there is no OTP typing burden imposed on the user, and the OTP can be relatively long and include non-readable characters for greater entropy. Furthermore, such techniques involve use of separate channels: one channel between the client device and the server and another channel between the mobile device and the server, thus eliminating creation of a security weak point.

One embodiment is directed to a method of authenticating a user to server equipment. The method includes reading, by a mobile device, a visual pattern from a client device, the mobile device and the client device being separate and distinct and in possession of the user. The method further includes generating, by the mobile device, a token message based on the visual pattern. The method further includes providing, by the mobile device, the token message to the server equipment to authenticate the user to the server equipment. Accordingly, if the user initially sends an identifier which identifies the user to the server equipment from a client device and the server equipment returns the identifier (perhaps with additional information) in the visual image, the user can then employ the mobile device to electronically read the visual image from the client device and communicate a OTP to the server equipment (in a manner which is out-of-band with the client device) as part of the authentication process. Such activity is capable of providing stronger security, e.g., OTPs with greater entropy, multiple communications channels to eliminate individual security weak points, etc.

In some arrangements, the visual pattern is a bar code image such as a one-dimensional bar code (e.g., a UPC bar code, an EAN bar code, an ITF bar code, etc.), a two-dimensional bar code (e.g., a QR code, a Datamatrix bar code, a PDF417 bar code, etc.), and so on. In these arrangements, the mobile device includes a camera (or other scanning mechanism) and reading the visual pattern includes capturing, using the camera of the mobile device, the bar code image which the client device (i) has received from the server equipment and (ii) renders on an electronic display. Reading the visual pattern further includes extracting bar code data from the bar code image, the bar code data including a user identifier which uniquely identifies, to the server equipment, the user among a plurality of users.

In some arrangements, generating the token message includes providing, within the token message, a set of authentication factors for evaluation by the server equipment when authenticating the user. The set of authentication factors can include a OTP, mobile device artifacts (e.g., a mobile device identifier, a GPS location, user biometrics obtained by the mobile device, etc.), and so on.

In some arrangements, the bar code data further includes an authentication session identifier which uniquely identifies a particular authentication session hosted by the server equipment among a plurality of authentication sessions hosted by the server equipment. In these arrangements, generating the token message further includes providing, within the token message, the authentication session identifier which uniquely identifies the particular authentication session.

In some arrangements, the bar code data further includes a server identifier which uniquely identifies a particular server device of the server equipment among other server devices of the server equipment. In these arrangements, providing the token message to the server equipment includes sending the token message to the particular server device of the server equipment among the other server devices of the server equipment based on the server identifier.

In some arrangements, capturing the bar code image using the camera of the mobile device includes scanning the bar code image from a web page which is (i) received by the client device in response to the client device sending the server equipment an authentication request and (ii) rendered on an electronic display of the client device. The web page includes the bar code image and a prompt which prompts the user to send a confirmation message from the client device to the server equipment after the token message is provided by the mobile device to the server equipment.

In some arrangements, the web page and the confirmation message are conveyed between the client device and the server equipment through a first communications channel. In these arrangements, the token message is conveyed from the mobile device to the server equipment through a second communications channel which is separate and distinct from the first communications channel.

In some arrangements, the method further includes capturing, using the camera of the mobile device, another bar code image which the client device (i) has received from the server equipment in response to the client device providing an invalid user identifier to the server equipment and (ii) renders on the electronic display. In these arrangements, the method further includes extracting other bar code data from the other bar code image, the other bar code data including the invalid user identifier. Additionally, the method further includes generating another token message based on the other bar code data, the other token message including the invalid user identifier, and providing the other token message to the server equipment.

Another embodiment is directed to an electronic apparatus which includes memory, and control circuitry coupled to the memory. The memory stores instructions which, when carried out by the control circuitry, cause the control circuitry to:

(A) read a visual pattern from a client device, the electronic apparatus and the client device being separate and distinct and in possession of the user,
(B) generate a token message based on the visual pattern, and
(C) provide the token message to server equipment to authenticate the user to the server equipment.

Yet another embodiment is directed to a computer program product having a non-transitory computer readable medium which stores a set of instructions to authenticate a user to server equipment. The set of instructions, when carried out by computerized circuitry, causes the computerized circuitry to perform a method of:

(A) reading a visual pattern from a client device, the computerized circuitry and the client device being separate and distinct and in possession of the user;
(B) generating a token message based on the visual pattern; and
(C) providing the token message to the server equipment to authenticate the user to the server equipment.

It should be understood that, in the cloud context, the certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in authenticating a user using a client device and a mobile device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to authentication using both a client device and a mobile device. Along these lines, a user initially directs the client device to establish an authentication session with server equipment. Upon receiving a response from the server equipment, the client device displays a visual pattern. The mobile device reads this visual pattern, generates a token message based on the visual pattern, and provides the token message to the server equipment to authenticate the user. Such a technique does not require the user to manually read or type in OTPs. Rather, the mobile device is capable of automatically embedding a OTP in the token message. Accordingly, there is no OTP reading or typing burden imposed on the user, and the OTP can be relatively long and include non-readable characters for greater entropy. Additionally, such a technique involves use of separate channels: a first channel between the client device and the server equipment and a second channel between the mobile device and the server equipment, thus eliminating creation of a security weak point.

Figure 1:
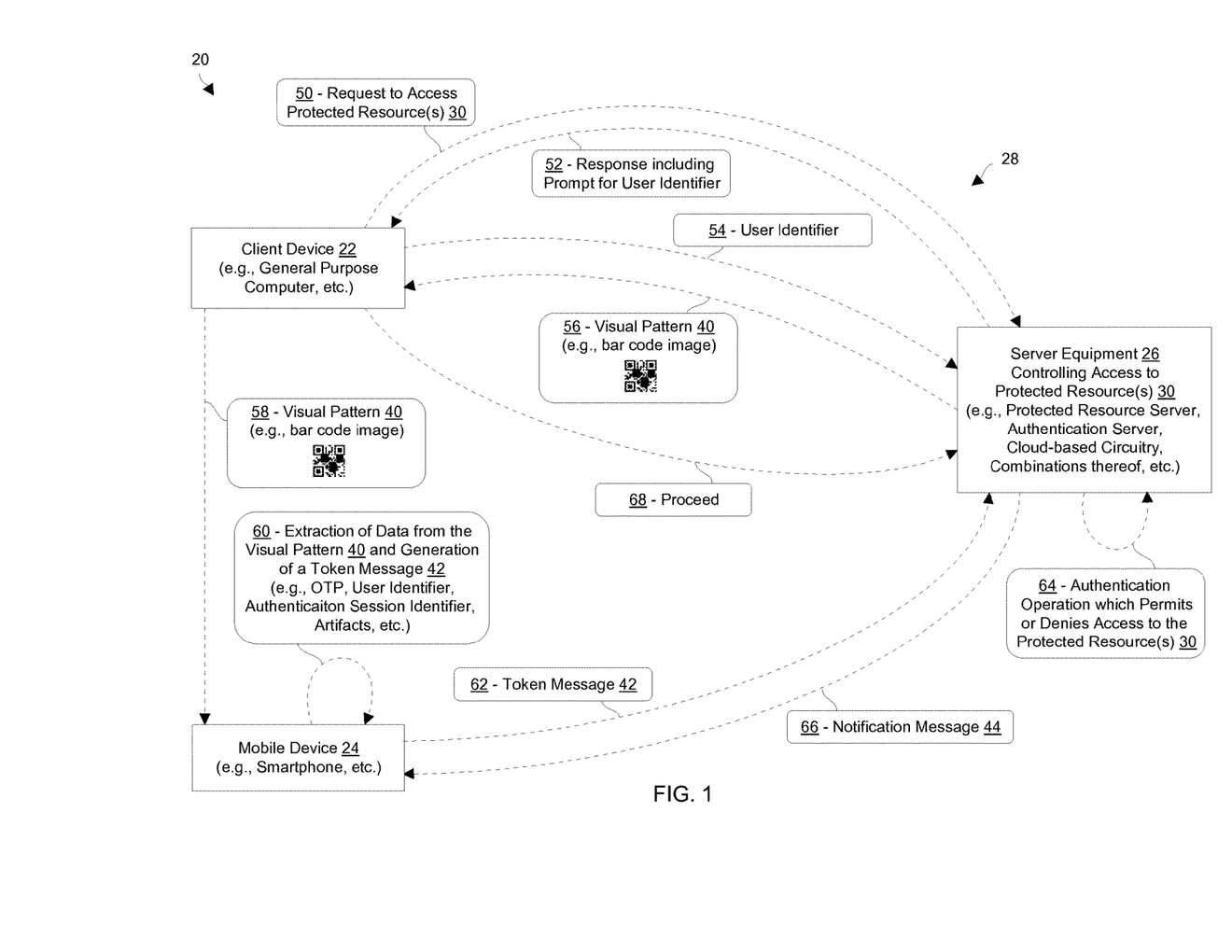
FIG. 1 is a block diagram showing particular components of an electronic environment and their interaction when authenticating a user.

FIG. 1 is a block diagram showing particular components of an electronic environment 20 that are involved in authenticating a user. The electronic environment 20 includes a client device 22, a mobile device 24, server equipment 26 and a communications medium 28 (shown generally by the arrow 28).

The client device 22 is constructed and arranged to access one or more protected resources 30 from the server equipment 26 through the communications medium 28. Such protected resources 30 may include content (e.g., documents, files, database entries, movies, music, other types of visual and/or audio media, general information, games, etc.), services (e.g., banking transactions, securities trading, online ordering and purchasing, etc.), VPN access, application access, permissions and/or privileges, other accessible computerized resources, combinations thereof, and so on. A suitable form factor for the client device 22 is a general purpose computer or similar device (e.g., a workstation, a laptop, a terminal, etc.) which is capable of rendering visual patterns 40 which must be properly processed by the mobile device 24 prior to obtaining access to the protected resources 30.

The mobile device 24 is constructed and arranged to operate cooperatively with the client device 22 during user authentication with the server equipment 26. In particular, the mobile device 24 is capable of scanning visual patterns 40 rendered by the client device 22 and, based on the visual patterns 40, generating token messages 42 and sending the token messages 42 to the server equipment 26 through the communications medium 28 to authenticate the user.

The server equipment 26 generally refers to all electronic devices that are involved in securely providing access to the protected resources 30. Such devices may include one or more protected resource servers (e.g., host computers, data storage arrays, compute servers, web servers, etc.), authentication servers (e.g., authentication managers, risk engines, etc.), proxies, and so on. In some arrangements, the various components may be operated by different entities, e.g., a web server operated by a first company, an authentication server operated by a trusted third-party, etc.

The communications medium 28 is constructed and arranged to connect the various components of the electronic environment 20 together to enable these components to exchange electronic signals. The communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, telephone communications, combinations thereof, etc.

During operation, the client device 22 and the mobile device 24 operate cooperatively and separately communicate with the server equipment 26 through the communications medium 28 to successfully authenticate the user to the server equipment 26 before the server equipment 26 allows the user to access a protected resource 30. Otherwise, the user is denied access to the protected resource 30. Accordingly, if either of the client device 22 or the mobile device 24 is lost or stolen, access to the protected resource 30 remains secure. Further step-by-step details of the operation of the particular components of the electronic environment 20 will now be provided.

First, when the user wishes to access a protected resource 30, the user directs the client device 22 to send an access request to the server equipment 26 through the communications medium 28 (see 50). Such activity initiates an authentication session with the server equipment 26. In some arrangements, the user launches a web browser (or a specialized application) which sends a web-based access request (or a specialized request) to the server equipment 26 through the communications medium 28.

Next, the server equipment 26 sends a response which includes a user prompt for a user identifier which uniquely identifies the user among other users (see 52). It should be understood that the server equipment 26 may control access to the protected resources 30 for multiple users and thus manage a database of users which are uniquely identified by respective user identifiers. Suitable user identifiers include usernames, user numbers, email addresses, and so on.

Subsequently, the user directs the client device 22 to send the user's user identifier to the server equipment 26 (see 54). In some arrangements, the user enters the user identifier into a field, a dialog box, or a webpage form which the client device 22 then sends to the server equipment 26. If the user has used the client device 22 to access the protected resource 30 in the past, the client device 22 may automatically provide the user identifier from memory (e.g., from a cookie, from a local database, etc.) thus alleviating the need for the user to re-type the user identifier.

In response, the server equipment 26 returns a visual pattern 40 which is rendered on a display (or electronic monitor) of the client device 22 (see 56). In some arrangements, the visual pattern 40 is a bar code image (e.g., a one-dimensional bar code, a two-dimensional bar code, etc.) which is viewable on the display of the client device 22. The bar code image includes (i) the user identifier provided by the user, (ii) an authentication session identifier, and (iii) optionally other data (e.g., an identifier which identifies a particular server of the server equipment 26, etc.). The visual pattern 40 may be encoded and/or encrypted in a variety of ways for additional security (e.g., to prevent decoding or hacking of the data contained in the visual pattern 40 by the client device 22). Suitable formats for the visual pattern 40 include UPC bar code format, EAN, ITF, QR code format, Datamatrix, PDF417, proprietary formats, and so on.

Next, the user directs the mobile device 24 to read the visual pattern 40 from the client device 22 (see 58). Along these lines, the user operates a camera of the mobile device 24 to capture the visual pattern 40 for further processing.

Once the mobile device 24 reads the visual pattern 40, the mobile device 24 extracts data from the visual pattern 40 and creates a token message 42 (see 60). In particular, the mobile device 24 extracts the user identifier, the authentication session identifier, and optionally the other data. The mobile device 24 then generates a OTP (e.g., by inputting a secret into an OTP generation algorithm to output the OTP), and includes the OTP and authentication session identifier in the token message 42. The OTP is included in the token message 42 to prove to the server equipment 26 that the user of the client device 22 is also in possession of the mobile device 24 (e.g., that the user is not a hacker but instead actually possesses the mobile device 24, i.e., an advanced authentication token). Since the OTP is automatically included in the token message 42, it is unnecessary for the user to type the OTP and the OTP can be longer (e.g., more digits) and include more than standard characters (e.g., non-readable characters) thus increasing security strength.

It should be understood that the data that was contained within the visual image 40 from the server equipment 26 provides certain advantageous features. Along these lines, the authentication session identifier from the visual image 40 is included in the token message 42 to enable the server equipment 26 to distinguish the user's utilization of the client device 22 from a possible simultaneous access attempt by a fraudster using a different client device (i.e., a fraudster might initiate another authentication session but, in that case, would be sent a different authentication session identifier). Furthermore, the optional other data from the visual image 40 may include an identifier which identifies a particular device of the server equipment 26 which is to handle the authentication session (e.g., the server equipment 26 may be cloud based or distributed among different locations).

Next, the mobile device 24 sends the token message 42 to the server equipment 26 (see 62). It should be understood that communications channel between the mobile device 24 and the server equipment 26 is different than the communications channel between the client device 22 and the server equipment 26. Accordingly, a network-style attacker would need to compromise both communications channels to thwart security.

Next, the server equipment 26 performs the authentication operation (see 64). In particular, the server equipment 26 matches the user identifier and the authentication session identifier from the client device communications with those of the token message 42 from the mobile device communication in order to properly identify the correct authentication session and the correct user. Matching the user identifier enables the server equipment 26 to avoid confusing one authentication session involving one user, with another authentication session involving another user. Additionally, matching the authentication session identifier prevents a fraudster from successfully gaining access to the protected resource by trying to time an access attempt with the access attempt of the legitimate user (i.e., even if the fraudster might have the user identifier of the legitimate user, the fraudster would not have the authentication session identifier).

If authentication is successful, the server equipment 26 allows the user to access the protected resource 30 using the client device 22. For example, the user may be permitted to download content, perform a transaction, access a VPN, run an application, and so on.

However, if authentication is unsuccessful, the server equipment 26 denies access to the protected resource 30 as well as optionally take some form of remedial action. Examples of such remedial action include permitting the user to retry authenticating a certain number of times before locking out the user, step up authentication (i.e., providing the user with another challenge that provides stronger security), outputting an alert (e.g., to an administrator, to the legitimate user, to both, etc.), combinations thereof, and so on.

The server equipment 26 then sends a notification message 44 back to the mobile device 24 indicating whether authentication is successful (see 66). If the mobile device 24 receives a notification message 44 indicating successful authentication, the user directs the client device 22 to proceed with accessing the protected resource 30 (see 68). For example, the user may click on a "Proceed" button on the client device 22.

However, if the notification message 44 indicates that authentication has failed, the user is denied access to the protected resource 30. In some arrangements, the user may be permitted to re-authenticate (e.g., step-up authentication where the user further provides a personal identification number or PIN, etc.) where the mobile device 24 generates a new OTP and then sends the new OTP and other information (e.g., an authentication session identifier, a user identifier, etc.) to the server equipment 26 for authentication (see 60-66). Further details will now be provided with reference to FIG. 2.

Figure 2:
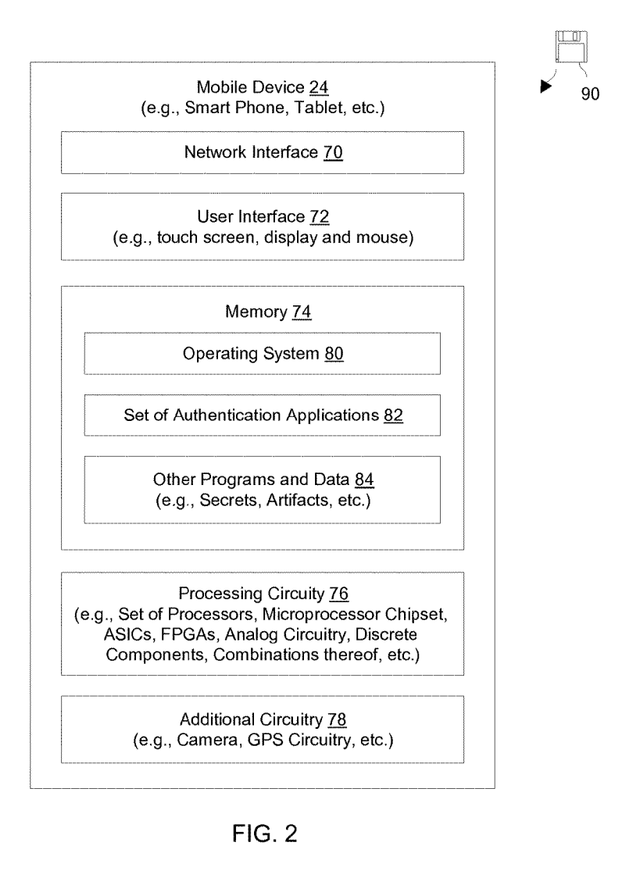
FIG. 2 is a block diagram illustrating particular details of a mobile device of FIG. 1.

FIG. 2 is a block diagram illustrating particular details of the mobile device 24. The mobile device 24 includes a network interface 70, a user interface 72, memory 74, processing circuitry 76, and additional circuitry 78. As mentioned earlier, The architecture and/or form factor for the mobile device 24 may be that of a smartphone, a tablet, or the like which the user can maintain possession of and which the user can use to read a visual image 40 from the client device 22, e.g., capture a scan of a bar code image from an electronic display of the client device 22.

The network interface 70 is constructed and arranged to connect the mobile device 24 to the communications medium 28 (FIG. 1). Accordingly, the network interface 70 enables the mobile device 24 to communicate with the other components of the electronic environment 20. Such communications may be copper-based or wireless (i.e., IP-based, SAN-based, cellular, Bluetooth, combinations thereof, and so on).

The user interface 72 is constructed and arranged to receive input from a user and provide output to the user. In the context of a smartphone or a tablet, the user interface 72 may be formed by other components such as a miniature keyboard and display, a touch screen, and so on.

The memory 74 is intended to represent both volatile storage (e.g., DRAM, SRAM, etc.) and non-volatile storage (e.g., flash memory, magnetic disk drives, etc.). The memory 74 stores a variety of software constructs including an operating system 80, a set of authentication applications 82, and other programs and data 84.

The processing circuitry 76 is constructed and arranged to operate in accordance with the various software constructs stored in the memory 74. In particular, the processing circuitry 74, when executing the operating system 80, manages various resources of the mobile device 24 (e.g., memory allocation, processor cycles, etc.). Additionally, the processing circuitry 76 executing the set of applications 82 forms specialized circuitry which electronically reads visual patterns 40, generates token messages 42 based on the visual patterns 40, and provides the token messages 42 to the server equipment 26 to authenticate the user.

It should be understood that the above-mentioned processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the mobile device 24. The computer program product 90 has a non-transitory and non-volatile computer readable medium which stores a set of instructions to control one or more operations of the mobile device 24. Examples of suitable computer readable storage media include tangible articles of manufacture and apparatus which store instructions in a non-volatile manner such as CD-ROM, flash memory, disk memory, tape memory, and the like.

The additional circuitry 78 includes a camera and perhaps other specialized circuitry. The camera reads the visual images 40 from electronic displays. The other specialized circuitry can include GPS circuitry, a microphone and a speaker for audio input/output (I/O), a set of accelerometers, a fingerprint scanner, an antenna, and so on. In some arrangements, the additional circuitry 78 collects artifacts which can be used during authentication of the user. Such artifacts include biometrics (e.g., face scan, voice sample, fingerprint scan, etc.), geolocation (via the GPS circuitry), gate or average height (via the accelerometers), average lighting (via the camera), network environment (via the antenna), and so on. Further details will now be provided with reference to FIG. 3.

Figure 3:
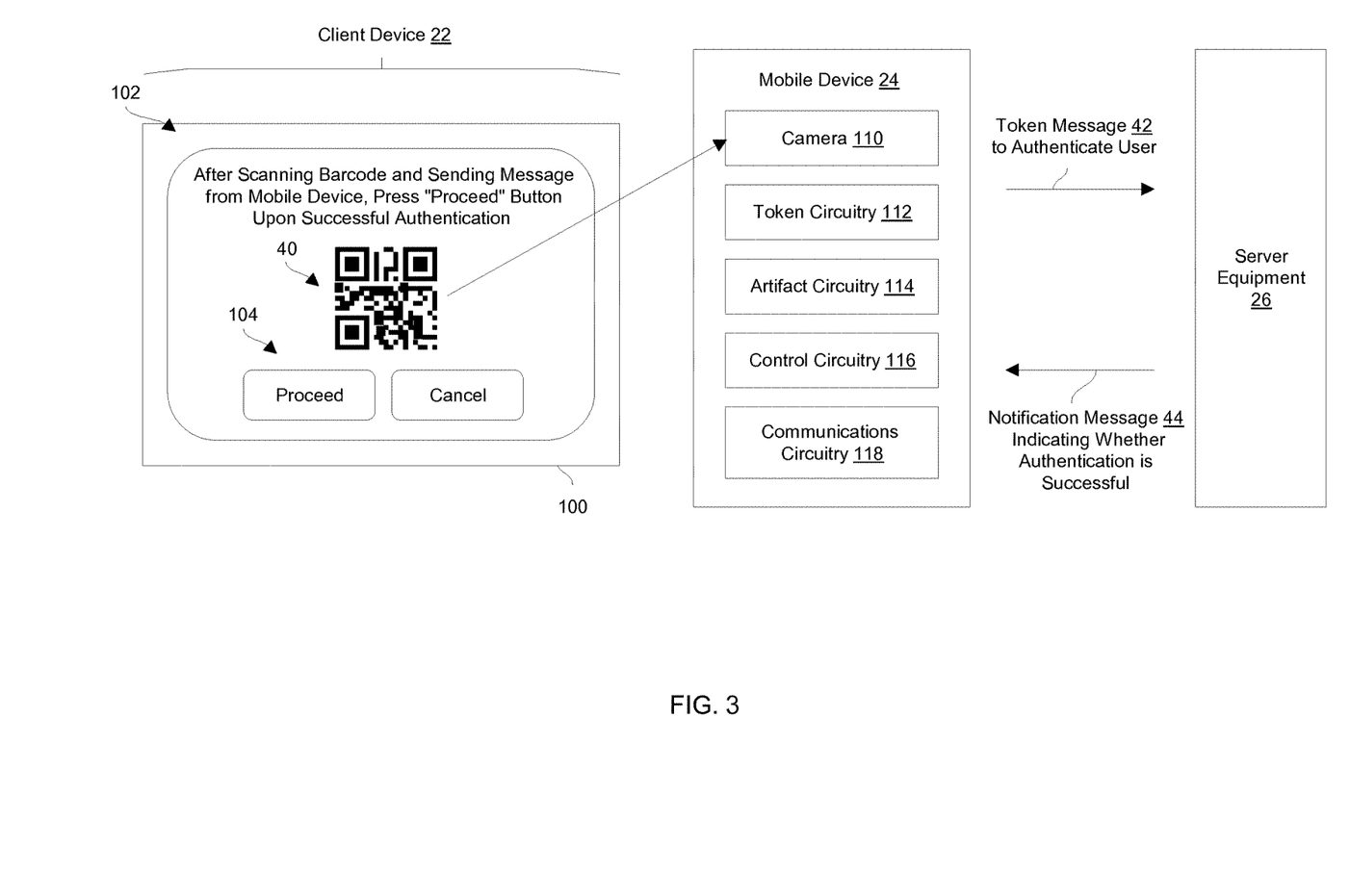
FIG. 3 is a block diagram of particular details of a client device and a mobile device of the electronic environment of FIG. 1.

FIG. 3 illustrates an exchange between the client device 22 and the mobile device 24. As shown in FIG. 3, an electronic display 100 of the client device 22 displays a screen 102 which includes the visual image 40 that the client device 22 has received from the server equipment 26 (FIG. 1). The screen 102 may take the form of a webpage on a web browser, a pane or window of a graphical user interface (GUI) application, or the like.

As further shown in FIG. 3, the mobile device 24 is equipped with a variety of circuits and components including a camera 110, token circuitry 112, artifact circuitry 114, control circuitry 116, and communications circuitry 118. Some of this circuitry may be formed by specialized hardware such as the camera 110 and artifact circuitry 114 (also see the additional circuitry 78 in FIG. 2), and the communications circuitry 118 (also see the network interface 70 in FIG. 2). Other circuitry such as the token circuitry 112 and the control circuitry 116 may be formed by the processing circuitry 76 running one or more applications (also see the authentication applications 82 and other programs and data 84 in FIG. 2).

During operation, the user activates the control circuitry 116 which causes the visual image 40 to be read from the screen 102 via the camera 110. For example, the user can activate a special authentication app on the mobile device 24, and the processing circuitry 76 running in accordance with that app operates the camera 110 to capture a scan of the visual image 40.

Additionally, while the mobile device 24 runs that app, the control circuitry 116 directs the token circuitry 112 to generate a OTP. In some arrangements, the OTP is based on a secret stored in the mobile device 24 (e.g., see the other programs and data 84 in FIG. 2). In other arrangements, the OTP is based on the secret as well as other parameters (e.g., time, the user identifier contained in the visual image 40, the authentication session identifier contain in the visual image 40, combinations thereof, etc.).

Furthermore, the control circuitry 116 extracts the user identifier, the authentication session identifier, and perhaps other information (e.g., an identifier for a particular server device of the server equipment 26) from the visual image 40, and includes the OTP, the user identifier, and the authentication session identifier in the token message 42 (FIG. 2). The control circuitry 116 then sends the token message 42 to the server equipment 26 via the communications circuitry 118.

After the token message 42 has been sent from the mobile device 24 to the server equipment 26, the user receives a notification message 44 from the server equipment 26 indicating whether authentication is successful. If the notification message 44 indicates that authentication is successful, the user is permitted to access the protected resource 30 using the client device 22. Along these lines, the user may click on the "Proceed" button on the screen 102 and then access the protected resource 30 (also see 68 in FIG. 1). If the notification message 44 indicates that authentication is unsuccessful, the user may attempt to re-authenticate, e.g., by directing the mobile to generate a new OTP and send a new token message 42 to the server equipment 26, etc. Further details will now be provided with reference to FIG. 4.

Figure 4:
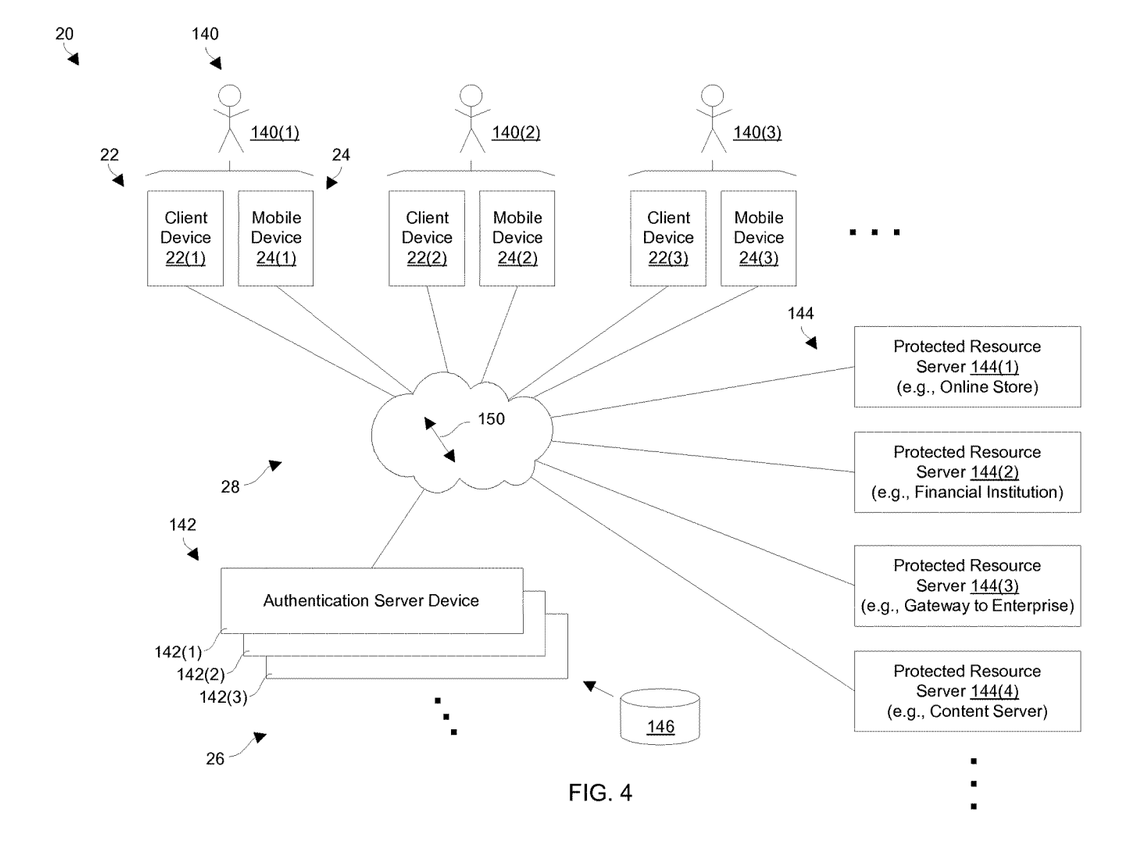
FIG. 4 is a block diagram of further details of the electronic environment of FIG. 1.

FIG. 4 shows further details of the electronic environment 20 (also see FIG. 1). As shown in FIG. 4, each user 140 possesses a client device 22 and a mobile device 24. Along these lines, the user 140(1) possesses a client device 22(1) and a mobile device 22(1), the user 140(2) possesses a client device 22(2) and a mobile device 22(2), the user 140(3) possesses a client device 22(3) and a mobile device 22(3), and so on. Additionally, the server equipment 26 includes, by way of example only, a farm of authentication server devices 142(1), 142(2), 142(3), . . . , and multiple protected resource servers 144(1), 144(2), 144(3), 144(4), . . . .

It should be understood that each protected resource server 144 can be controlled and operated by a different entity or organization. For example, the protected resource server 144(1) may be an online store operated by Company A, the protected resource server 144(2) may be a financial institution operated by Company B, and so on.

Moreover, the farm of authentication server devices 142 may be operated by an independent trusted third-party. Along these lines, the authentication server devices 142 may reside at a single location or may be distributed (e.g., at remote locations, in the cloud, etc.). To coordinate operation of the authentication server devices 142, each authentication server device 142 may access a common user database 146 which stores profiles of the users 140 based on user identifiers.

Although the communications medium 28 is illustrated as a network cloud 28, it should be understood that the client devices 22 and the mobile devices 24 can communicate with other devices of the electronic environment 20 using a variety of different electronic signals 150 (e.g., wireless, fiber optic, copper-based, combinations thereof, etc.). Moreover, the communications channels between the client devices 22 and the server equipment 26 are separate and independent of the communications channels between the mobile devices 24 and the server equipment 26.

It should be understood that, in some arrangements, the protected resource servers 144 may operate as authentication front-ends. That is, during authentication sessions, the client devices 22 and/or the mobile devices 24 may send communications to the protected resource servers 144 which then convey those communications to the authentication server devices 142 (i.e., back-end devices). Similarly, the authentication server devices 142 may send communications to the protected resource servers 144 which then convey those communications to the client devices 22 and/or mobile devices 24.

One should appreciate that the client devices 22 need not be tied (or bound) to particular users 140. Rather, each user 140 is free to use any client device 22 to access a protected resource 30. Furthermore, the mobile devices 24 are tied to respective users 140 since the mobile devices 24 maintain the secrets for generating the OTPs. Accordingly, the users 140 are capable of using untrusted client devices 22 with more confidence to access protected resources 30 as the users 140 do not have to worry about the possibility of key loggers installed in the client devices 22 since there is no need to type in OTPs into the client devices 22. Further details will now be provided with reference to FIG. 5.

Figure 5:
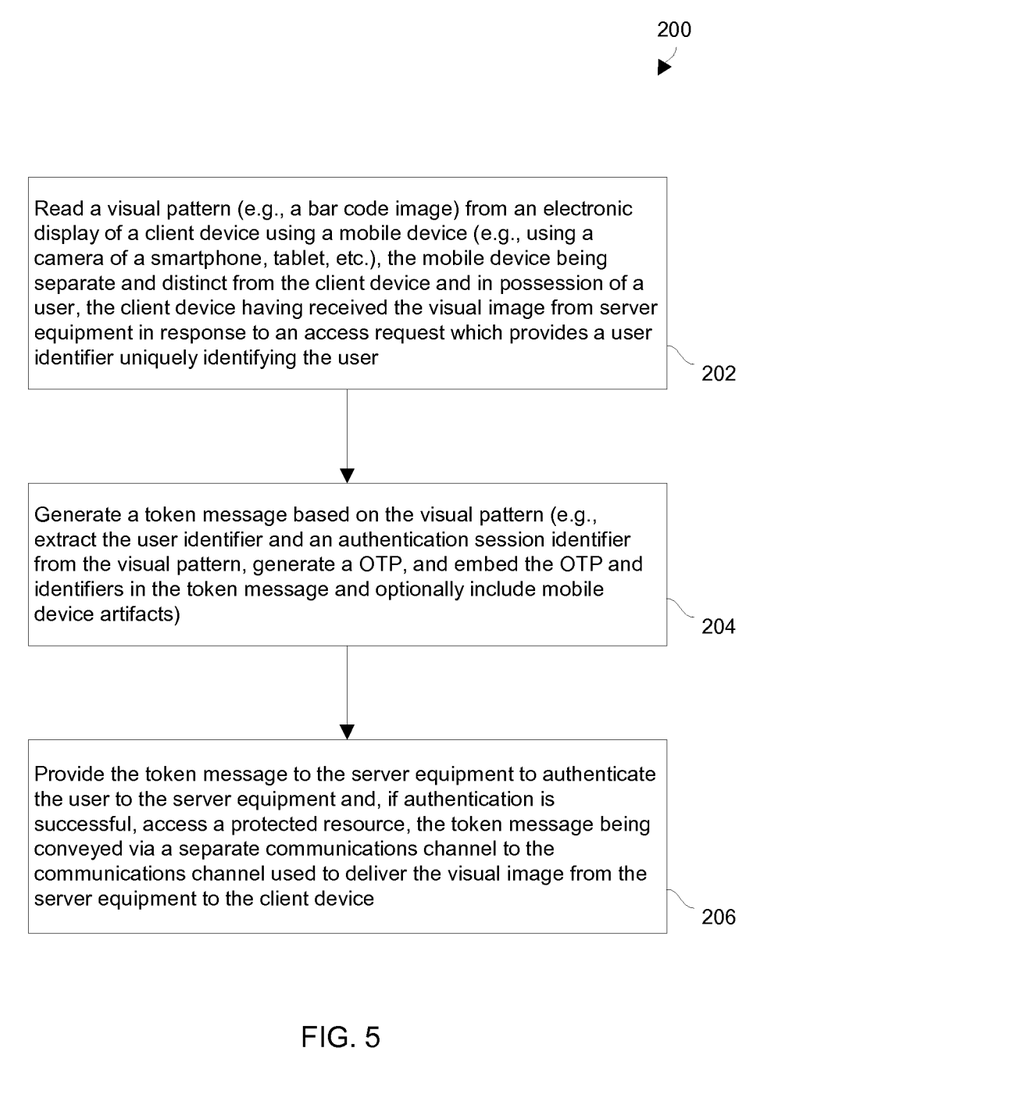
FIG. 5 is a flowchart of a procedure which is performed by the mobile device of FIG. 2.

FIG. 5 is a flowchart of a procedure 200 which is performed by a mobile device 24 to authenticate a user. At 202, the mobile device 24 reads a visual pattern 40 from an electronic display of a client device 22 (also see FIG. 3). For example, the user can launch a mobile app and capture the visual pattern 40 using a camera. As mentioned earlier, the mobile device 24 (e.g., the user's smartphone) and the client device 22 (e.g., the user's general purpose computer) are separate and distinct and in possession of the user.

At 204, the mobile device 24 generates a token message 42 based on the visual pattern 40 (also see FIGS. 1 and 3). In particular, the mobile device 24 generates a OTP, extracts a user identifier which uniquely identifies the user among other users and an authentication session identifier which uniquely identifies the authentication session among other authentication sessions, and includes the OTP and identifiers in the token message 42. In some arrangements, the mobile device 24 includes additional artifacts in the token message 42 for stronger authentication (e.g., biometric data, geolocation, etc.).

At 206, the mobile device 24 provides the token message 42 to the server equipment 26 to authenticate the user to the server equipment 26. In particular, the mobile device 24 uses a separate communications channel to the communications channel that was used to deliver the visual image 40 from the server equipment 26 to the client device 22. Such operation not only is less burdensome on the user than conventional schemes which involve conventional authentication tokens, such operation provides stronger security (e.g., stronger OTPs, separate communications channels, etc.).

As described above, improved techniques are directed to authentication using both a client device 22 and a mobile device 24. In particular, a user first directs the client device 22 to initiate an authentication session with server equipment 26. Upon receipt of a response from the server equipment 26, the client device 22 displays a visual pattern 40. The mobile device 24 electronically reads this visual pattern 40, generates a token message 42 based on the visual pattern 40, and provides the token message 42 to the server equipment 26 to authenticate the user. Such techniques do not require a computer user to manually read or type in OTPs. Rather, the mobile device 24 is capable of electronically embedding a OTP in the token message 42, and then sending the token message 42 to the server equipment 26 based on the visual pattern 40. Accordingly, there is no OTP typing burden imposed on the user, and the OTP can be relatively long and include non-readable characters for greater entropy. Furthermore, such techniques involve use of separate channels: one channel between the client device 22 and the server equipment 26 and another channel between the mobile device 24 and the server equipment 26, thus eliminating creation of a security weak point.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the communications channel between the mobile device 24 and the server equipment 26 can use a proprietary protocol (e.g., a better/proprietary channel encryption mechanism over conventional web-based communications). Such a feature provides stronger security than a conventional mechanism which relies on a single communications channel between a computer and a server.

Furthermore, it should be understood that the server equipment 26 can be configured provide a visual image 40 to a client device 22 regardless of whether the server equipment 26 has received a legitimate user identifier. Such operation prevents user enumeration thus preserving the security strength of the system. Such modifications and enhancements are intended to belong to various embodiments of the disclosure.

What is claimed is:

1. A method of authenticating a user to server equipment, the method comprising:
   reading, by a mobile device, a visual pattern from a client device, the mobile device and the client device being separate and distinct and in possession of the user;
   generating, by the mobile device, a token message based on the visual pattern; and
   providing, by the mobile device, the token message to the server equipment to authenticate the user to the server equipment;
   wherein the visual pattern is a bar code image; wherein the mobile device includes a camera; and
   wherein reading the visual pattern includes:
   capturing, using the camera of the mobile device, the bar code image which the client device (i) has received from the server equipment and (ii) renders on an electronic display, and
   extracting bar code data from the bar code image, the bar code data including a user identifier which uniquely identifies the user among a plurality of users and a session identifier which identifies the authentication session between the client device and the server equipment;
   wherein, prior to reading the visual pattern from the client device, (i) the user identifier is entered into the client device, (ii) the client device sends the user identifier to the server equipment, and (iii) the client device receives the bar code image, which includes the user identifier and the session identifier, from the server equipment; and
   wherein providing the token message to the server equipment includes, after the user identifier is extracted from the bar code image, conveying the user identifier and the session identifier within the token message to the server equipment, to enable the server equipment to authenticate the user using the user identifier and the session identifier in the token message, the user thereby being authenticated to the server equipment.

2. A method as in claim 1 wherein generating the token message includes:
   providing, within the token message, a set of authentication factors for evaluation by the server equipment when authenticating the user.

3. A method as in claim 2 wherein providing the set of authentication factors within the token message includes:
   generating a one-time use passcode and incorporating the one-time use passcode within the token message.

4. A method as in claim 3 wherein providing the set of authentication factors within the token message further includes:
   incorporating a set of mobile device artifacts within the token message, the set of mobile device artifacts serving as a set of additional authentication factors to authenticate the user to the server equipment.

5. A method as in claim 3 wherein the bar code data further includes a server identifier which uniquely identifies a particular server device of the server equipment among other server devices of the server equipment; and
   wherein providing the token message to the server equipment includes:
   sending the token message to the particular server device of the server equipment among the other server devices of the server equipment based on the server identifier.

6. A method as in claim 1 wherein capturing the bar code image using the camera of the mobile device includes:
scanning the bar code image from a web page which is (i) received by the client device in response to the client device sending the server equipment an authentication request and (ii) rendered on an electronic display of the client device, the web page including the bar code image and a prompt which prompts the user to send a confirmation message from the client device to the server equipment after the token message is provided by the mobile device to the server equipment.

7. A method as in claim 6 wherein the web page and the confirmation message are conveyed between the client device and the server equipment through a first communications channel; and
wherein the token message is conveyed from the mobile device to the server equipment through a second communications channel which is separate and distinct from the first communications channel.

8. A method as in claim 1, further comprising:
capturing, using the camera of the mobile device, another bar code image which the client device (i) has received from the server equipment in response to the client device providing an invalid user identifier to the server equipment and (ii) renders on the electronic display,
extracting other bar code data from the other bar code image, the other bar code data including the invalid user identifier,
generating another token message based on the other bar code data, the other token message including the invalid user identifier, and
providing the other token message to the server equipment.

9. A method as in claim 1, further comprising:
reading, by the mobile device, another bar code image from the client device, the other bar code image being displayed by the client device in response to (i) entrance of an invalid user identifier into the client device, (ii) the client device sending the invalid user identifier to the server equipment, and (iii) the server equipment sending the other bar code image, which includes the invalid user identifier, to the client device.

10. A method as in claim 1,
wherein the user identifier is entered into the client device and sent to the server equipment when initiating an authentication session between the client device and the server equipment; and
wherein the bar code image, which includes the user identifier, is received by the client device from the server equipment during the authentication session and after the client device sends the user identifier to the server equipment.

11. A computer program product having a non-transitory computer readable medium which stores a set of instructions to authenticate a user to server equipment, the set of instructions, when carried out by computerized circuitry, causing the computerized circuitry to perform a method of:
reading a visual pattern from a client device, the computerized circuitry and the client device being separate and distinct and in possession of the user;
generating a token message based on the visual pattern; and
providing the token message to the server equipment to authenticate the user to the server equipment;
wherein the visual pattern is a bar code image;
wherein the computerized circuitry includes a camera; and wherein reading the visual pattern includes:
capturing, using the camera of the computerized circuitry, the bar code image which the client device (i) has received from the server equipment and (ii) renders on an electronic display, and
extracting bar code data from the bar code image, the bar code data including a user identifier which uniquely identifies the user among a plurality of users and a session identifier which identifies the authentication session between the client device and the server equipment;
wherein the method further includes, prior to reading the visual pattern from the client device, (i) receiving entry of the user identifier into the client device, (ii) the client device sending the user identifier to the server equipment, and (iii) receiving, from the server equipment, the bar code image, which includes the user identifier and the session identifier, by the client device; and
wherein providing the token message to the server equipment includes, after the user identifier and the session identifier are is extracted from the bar code image, conveying the user identifier and the session identifier within the token message to the server equipment, to enable the server equipment to authenticate the user using the user identifier and the session identifier in the token message, the user thereby being authenticated to the server equipment.

12. A computer program product as in claim 11 wherein generating the token message includes:
providing, within the token message, a one-time use passcode for evaluation by the server equipment when authenticating the user.

13. A computer program product as in claim 12 wherein capturing the bar code image using the camera of the mobile device includes:
scanning the bar code image from a web page which is (i) received by the client device in response to the client device sending the server equipment an authentication request and (ii) rendered on an electronic display of the client device, the web page including the bar code image and a prompt which prompts the user to send a confirmation message from the client device to the server equipment after the token message is provided by the mobile device to the server equipment.

14. A computer program product as in claim 13 wherein the computerized circuitry resides within a mobile device; and wherein generating the token message further includes:
providing, within the token message, (i) a set of mobile device artifacts obtained from the mobile device, the set of mobile device artifacts serving as a set of additional authentication factors to authenticate the user to the server equipment, and (ii) a server identifier obtained from the bar code data, the server identifier uniquely identifying a particular server device of the server equipment among other server devices of the server equipment.

15. A method of authenticating a user to server equipment, the method comprising:
sending, from a client device, an authentication request to the server equipment, the authentication request initiating an authentication session between the client device and the server equipment and including a user identifier that uniquely identifies the user to the server equipment;
receiving, by the client device and as part of the authentication session, a visual pattern from the server equipment, the visual pattern encoding authentication session data, the authentication session data including the user identifier sent from the client device and a session identifier identifying the authentication session between the client device and the server equipment;

displaying the visual pattern on a display of the computing device;

acquiring, by a mobile device separate from the computing device, an image of the visual pattern displayed by the computing device;

generating, by the mobile device, a token message based on the authentication session data encoded in the visual pattern and extracted from the acquired image, the token message including the user identifier and the session identifier; and transmitting, by the mobile device, the token message to the server equipment, thereby enabling the server equipment to authenticate the user using the user identifier and the session identifier in the token message, the user thereby being authenticated to the server equipment.

16. A method claim 15, wherein generating the token message further includes incorporating, as part of the token message, a one-time passcode (OTP) generated by the mobile device based on a secret shared between the mobile device and the server equipment, thereby enabling the server equipment to further authenticate the user based on the OTP.

\* \* \* \* \*